May 18, 1926.

Re. 16,354

A. E. CARLBERG

WRENCH

Original Filed Jan. 23, 1922

2 Sheets-Sheet 1

Inventor
AUGUST E. CARLBERG

Hammond & Russell
Attorney

May 18, 1926. Re. 16,354

A. E. CARLBERG

WRENCH

Original Filed Jan. 23, 1922 2 Sheets-Sheet 2

Inventor
AUGUST E. CARLBERG

Hammond & Littell
Attorney

Reissued May 18, 1926.

Re. 16,354

UNITED STATES PATENT OFFICE.

AUGUST EDWIN CARLBERG, OF WORCESTER, MASSACHUSETTS, ASSIGNOR TO WALDEN-WORCESTER, INCORPORATED, OF WORCESTER, MASSACHUSETTS, A CORPORATION OF MASSACHUSETTS.

WRENCH.

Original No. 1,542,336, dated June 16, 1925, Serial No. 531,010, filed January 23, 1922. Application for reissue filed July 18, 1925. Serial No. 44,605.

This invention relates to wrenches and is particularly concerned with wrenches of the type in which a socket or like operating member is pivotally associated with the shank.

The object of the invention is to provide a wrench of the above character which will be strong and durable in construction and extremely cheap to manufacture.

A good understanding of the invention may be had from the following description of several specific forms of embodiment thereof, reference being had to the accompanying drawings, in which.

Similar characters of reference designate similar parts in each of the several views.

Figure 1:
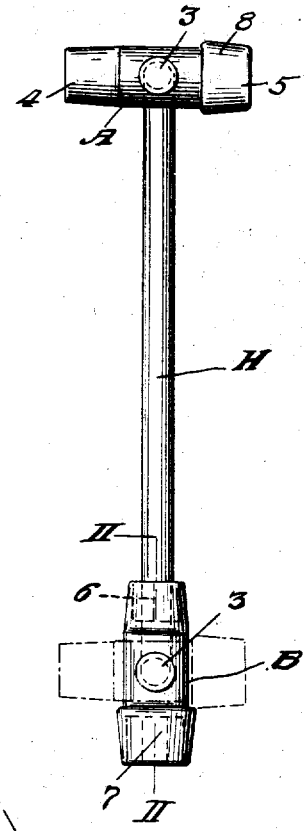
Figure 1 is a view illustrating one form of wrench embodying the invention.

The wrench illustrated in Figure 1 comprises a shank H formed of a steel rod or heavy wire, the ends of which are bent at right angles to form pivots for double-ended socket members A and B, these members being provided with transverse openings into which the bent-over portions of the rod H extend. The socket members are thus free to turn about axes at right angles to that of the handle. Shoulders 2 are provided on the shank for preventing sliding movement of the socket members, and the ends of the rods are upset, as indicated at 3, to hold the said sockets on the rod. It will be obvious that the projections which extend from each end of the rod H need not be integral therewith but may be in the form of separate pins welded or otherwise secured at right angles to the rod H at the ends thereof, and that the fundamental spirit of the inventtion is to pivot the sockets at right angles to the end of the wrench shank. The socket members proper may have any desired form of construction. In the illustrated type each socket member is double-ended, being provided with recesses 4, 5 and 6, 7, respectively, these recesses being preferably of different sizes and shapes so that a single wrench will accommodate as many as four different sizes of nuts or bolts.

Figure 3:
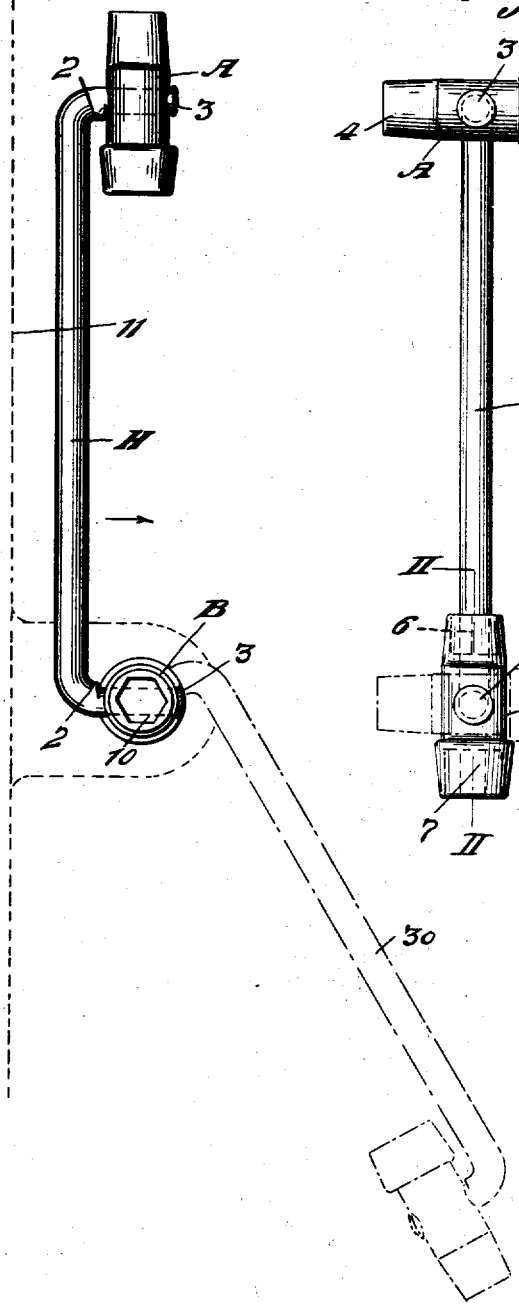
Figures 3 and 4 are views illustrating the wrench in use, Figure 3 being a plan and Figure 4 an elevational view.
Figure 4:
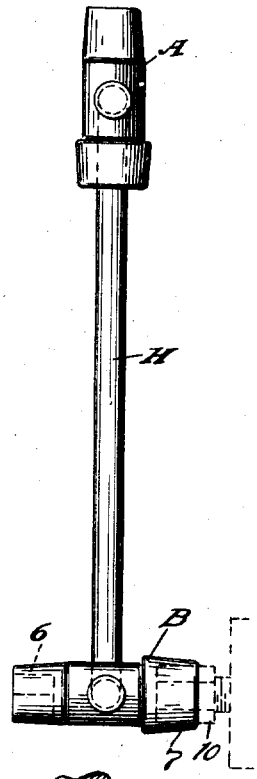
Figure 2:
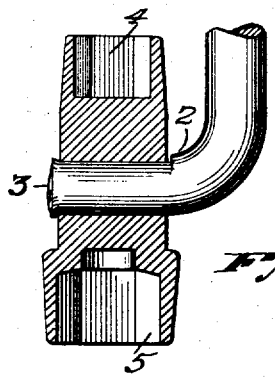
Figure 2 is a section of Figure 1 on lines II—II, drawn on a larger scale.

By virtue of the pivotal mounting of the sockets on the shank, the wrench may be used with facility in places where ordinary wrenches may be employed only with difficulty, if at all. In Figures 3 and 4 the socket 7 is illustrated as cooperating with a nut 10, the handle H being turned into a position at right angles to the socket member B in which position it affords maximum leverage. The socket member A thus serves as a hand-piece.

For the purpose of illustrating the manner of using the wrench in peculiar circumstances frequently met in practice, the dotted line 11 of Figure 3 is assumed to indicate a fixed part of the machine or other device to which the nut 10 is being applied, this part being assumed to extend so far above the nut as to prevent the handle from being turned through a complete horizontal circle. In such case the wrench is applied to the nut as indicated in Figure 3, and the handle is turned in the direction of the arrow past the position shown in dot-and-dash lines at 30 until further movement of the shank is prevented by the wall 11. The shank is thereupon turned through a vertical semi-circle and thus brought back to the initial position, the only difference being that the handle is reversed, i. e., at the right of sockets A and B in Figure 3, instead of at the left. The wrench is then turned through another horizontal semi-circle and again returned to the initial position by being turned through a vertical semi-circle. When thus manipulated, the wrench is substantially equivalent to a ratchet wrench in that similar operating results may be secured. The present wrench is superior to the ordinary ratchet wrench, however, because of its far cheaper construction and greater rigidity, having a minimum of movable parts.

Another manner of using the wrench is illustrated in Figure 1, in which the one socket member B is turned parallel to the shank, so that one of the sockets, namely, 7, may be used to cooperate with a nut or bolt. The other socket member A is turned at right angles to the shank so that it may be used as a handle. The wrench thus serves for like purposes as the well-known T-handle type of wrench and permits of convenient access to nuts or bolts located in deeply recessed or other obstructed parts of machinery.

It will be observed that because of the symmetrical construction, any one of the four sockets of the wrench may be utilized in the same manner as any one of the remaining three. A wide variety of conditions may thus be met by this single wrench.

Figure 5:
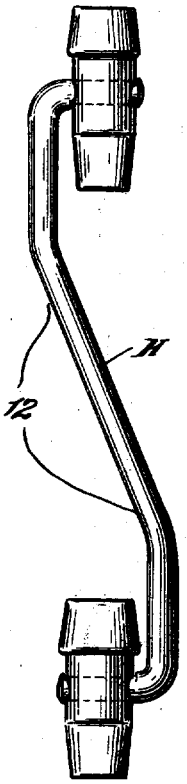
Figure 6:
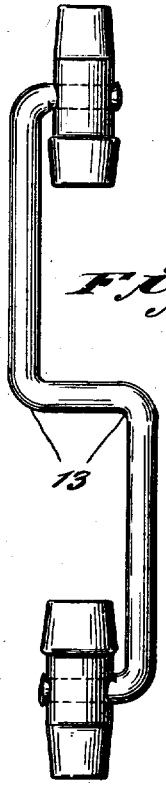

In Figures 5 and 6 are illustrated modifications of the previously described form, these modifications consisting in bending the shank to substantially S shape in order to secure the additional advantage of having the shank placed symmetrically to the sockets while retaining the sockets in alignment with each other. In Figure 5 this is accomplished by oblique bends 12, and in Figure 6 by rightangled bends 13.

Figure 7:
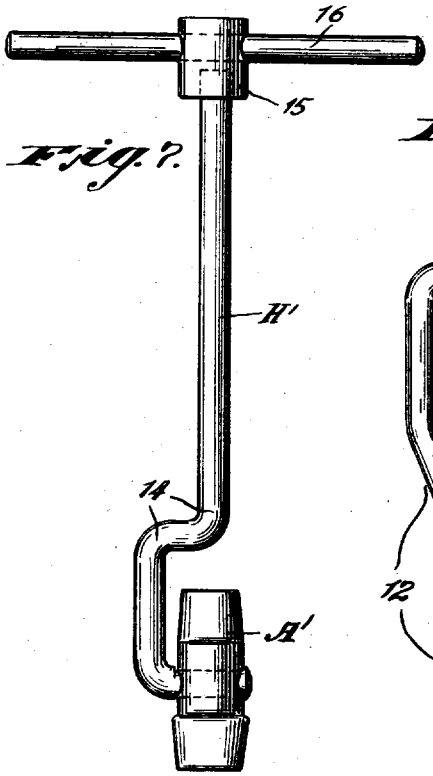
Figures 5, 6 and 7 are views showing modifications of Figure 1.

In Figure 7 is illustrated a modification in which the shank H′ is provided with only a single double-ended socket A′, right-angled bends 14 being provided in the shank to bring about alignment of the socket member and the shank. The upper end of the shank is provided with a fixed head 15 through which extends a cross arm 16 for serving as a handle. It will be observed that this form of construction is the equivalent of two ordinary T-handle wrenches, and has the additional advantage of being capable of use in a manner equivalent to that of a ratchet wrench, substantially as hereinbefore described.

Figure 8:
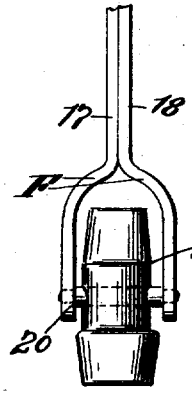
Figure 8 is a view showing a modified form of shank construction.

Figure 8 illustrates a form of construction in which alignment of the shank and socket member is secured by forming the shank of a pair of flat steel bars 17 and 18 which are united in any suitable manner at the intermediate portion of the shank and spread apart at the end to form the fork F. The socket member A″ is rotatably mounted in this fork by means of a pin 20 which extends through the socket member into the bars 17 and 18.

Figure 9:
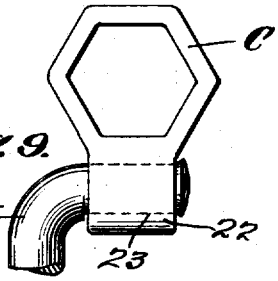
Figures 9 and 10 are views showing modified forms of sockets.
Figure 10:
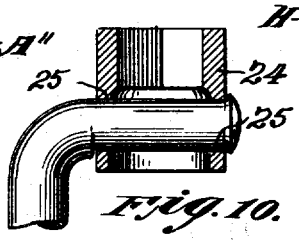

Figure 9 illustrates a modified form of socket consisting of a socket member C provided with an ear 22 having an opening 23 for receiving the shank H. Still another modification of socket is illustrated in Figure 10, which shows a tubular member 24 which is open clear through and the walls of which are sufficiently thin as to permit of the punching of the openings 25 for receiving the wire shank. The operation of drilling the holes is thus dispensed with so that a still greater saving in cost of production is obtained.

Although I have herein shown and described only a few forms of embodiment of my invention, it will be readily understood that many changes and modifications may be made therein and that parts described as integral may be made in two or more pieces within the scope of the following claims without departing from the spirit and scope of the invention, it being my intention to claim the same broadly in whatever form its principles may be employed.

What I claim is:

1. In combination, a socket, a shank, the entire shank forming a straight line, an integral projection extending at an angle from said straight shank, said socket being pivoted on said projection and being free to make a complete revolution in a plane parallel to and spaced from the axis of said shank and means to prevent movement of the socket longitudinally of said shank.

2. In combination, a double-ended socket, a shank, the entire shank being straight, said shank having an integral projection extending at right angles therefrom, said double-ended socket being provided with a transverse opening at the midpoint thereof for receiving said projection and being pivotally mounted to turn in a plane parallel to said shank.

3. A wrench comprising a shank the entire shank being straight, a projection extending at right angles near each end of said straight shank, a socket member pivotally associated with each projection, each socket being free to turn about an axis at right angles to said shank and to turn in a plane parallel thereto.

4. A wrench comprising a shank the entire shank being straight except for each end of said shank being bent at right angles, a socket member having a transverse opening for loosely receiving said right angled portion of the shank, each extremity of said bent portions being riveted over to retain the socket member thereon.

5. A wrench comprising a shank substantially straight throughout its entire length, a projection extending at right angles from said shank, a socket pivoted on said projection and adapted to make a complete revolution in a plane parallel to and spaced from the axis of said shank, means to retain said socket on said projection, and means to prevent movement of the socket onto the shank.

6. A wrench comprising a shank the entire shank being straight, projections extending at right angles to the shank at each end thereof, socket members pivoted on the projections, and means to retain said socket members on said projections.

7. A wrench comprising a shank, the entire shank being straight, an integral projection extending at right angles from each end of said straight shank, a double-ended socket member having a hole through substantially the midpoint thereof transverse to the axis of the nut-engaging portions pivoted on the projection at each end of said shank, and means to retain said sockets on said projections.

8. A wrench of the type described, comprising a shank, projections extending at right angles from each end of said shank, and a double-ended wrench socket having a hole through the midpoint thereof transverse to the axis of the nut-engaging portions, pivoted on said projections and being free to turn on the same.

9. A wrench, comprising a shank, the entire shank being straight, a double-ended wrench socket having a hole through the midpoint thereof transverse to the axis of the nut-engaging sockets pivoted adjacent the end of the shank on an axis at right angles to the shank, said socket being free to make a complete revolution on said pivot in a plane parallel to the axis of said shank, said socket and said shank being permanently secured together.

10. As an article of manufacture, a wrench comprising a handle having two heads pivoted thereto at opposite ends on pivots at right angles to both the heads, whereby the handle can be turned at any desired angle from the head which is in operation, and the other head can be turned at right angles to the handle and used as a hand grip.

In testimony whereof, I have affixed my signature to this specification.

AUGUST EDWIN CARLBERG.